United States Patent
Shido et al.

(10) Patent No.: US 9,137,427 B2
(45) Date of Patent: Sep. 15, 2015

(54) IMAGING APPARATUS AND IMAGE DISPLAY METHOD THEREFOR

(71) Applicant: CANON KABUSHIKI KAISHA, Tokyo (JP)

(72) Inventors: Shunichi Shido, Zama (JP); Hideo Mori, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 213 days.

(21) Appl. No.: 13/908,448

(22) Filed: Jun. 3, 2013

(65) Prior Publication Data

US 2013/0329089 A1    Dec. 12, 2013

(30) Foreign Application Priority Data

Jun. 12, 2012   (JP) ................................ 2012-132867

(51) Int. Cl.
| | |
|---|---|
| H04N 5/228 | (2006.01) |
| H04N 5/222 | (2006.01) |
| G03B 17/00 | (2006.01) |
| H04N 5/217 | (2011.01) |
| H04N 5/232 | (2006.01) |

(52) U.S. Cl.
CPC ......... *H04N 5/2173* (2013.01); *H04N 5/23293* (2013.01); *G09G 2320/02* (2013.01)

(58) Field of Classification Search
CPC .......... H04N 5/23248; H04N 5/23251; H04N 5/23254; H04N 5/23258; H04N 5/23261; H04N 5/23264
USPC ............... 348/333.01–333.13, 208.12, 207.2, 348/154, 155, 208.4, 208.5, 208.7, 208.13, 348/208.6; 345/102; 396/55
See application file for complete search history.

(56) References Cited

U.S. PATENT DOCUMENTS

| | | | |
|---|---|---|---|
| 5,502,710 A | 3/1996 | Washizawa et al. | |
| 5,835,243 A | 11/1998 | Mori | |
| 6,445,411 B1* | 9/2002 | Shibata et al. | 348/211.99 |
| 6,806,903 B1* | 10/2004 | Okisu et al. | 348/254 |
| 7,787,045 B2* | 8/2010 | Ueda et al. | 348/364 |
| 2006/0119556 A1* | 6/2006 | Winters et al. | 345/82 |
| 2007/0063961 A1* | 3/2007 | Kuroki | 345/102 |
| 2007/0211161 A1* | 9/2007 | Okamoto | 348/333.12 |
| 2009/0102931 A1* | 4/2009 | Yoshikawa et al. | 348/207.2 |
| 2009/0135304 A1* | 5/2009 | Inoue et al. | 348/712 |
| 2010/0231800 A1* | 9/2010 | White et al. | 348/663 |
| 2012/0127368 A1* | 5/2012 | Jak et al. | 348/576 |

FOREIGN PATENT DOCUMENTS

JP     2006-323300 A    11/2006

* cited by examiner

*Primary Examiner* — Sinh Tran
*Assistant Examiner* — Xi Wang
(74) *Attorney, Agent, or Firm* — Fitzpatrick, Cella, Harper & Scinto

(57) ABSTRACT

An imaging apparatus includes a display device for suppressing a motion blur during a panning operation and displaying a picture with high simultaneity. The imaging apparatus also includes: an imaging unit including a lens and an imaging element; a display device including a pixel whose light emission period is adjustable, for displaying an image of a target object to be imaged; an angular velocity sensor for detecting a movement of the imaging element; a panning speed detection unit for detecting a panning speed based on an output from the angular velocity sensor; a light emission period ratio determination unit for determining a light emission period ratio of the pixel based on the panning speed; and a display device driving unit for driving the display device by using the light emission period ratio determined by the light emission period ratio determination unit.

12 Claims, 6 Drawing Sheets

TELEPHOTO

WIDE-ANGLE

IMAGING APPARATUS AND IMAGE DISPLAY METHOD THEREFOR

BACKGROUND OF THE INVENTION

1. Field of the Invention

The present invention relates to an imaging apparatus including a display device capable of displaying an image of a target object to be imaged, and an image display method therefor.

2. Description of the Related Art

An imaging apparatus, such as a digital camera or a digital video camera, has a finder or a back surface provided with a display, such as a liquid crystal display or an organic EL display, which is used for imaging or confirmation of an image obtained by the imaging.

In general, in a case of displaying a moving image on the display, an afterimage remains when a light emission period ratio (duty cycle) of each frame or field is large, which causes such a "motion blur" that the contour of the moving image becomes obscure. The motion blur can be suppressed by reducing the light emission period ratio in accordance with a display speed of the moving image.

Japanese Patent Application Laid-Open No. 2006-323300 proposes a system in which the speed of a moving image is detected from input video data to control a value of the light emission period ratio for display. According to the technology disclosed in Japanese Patent Application Laid-Open No. 2006-323300, images are compared between frames, and the moving image speed is calculated to control the corresponding light emission period ratio, which can suppress the motion blur.

As described above, the display provided to the imaging apparatus, such as the digital camera or the digital video camera, is used when imaging is performed, and therefore has a display function called "live view" in which the image of a target object to be imaged is displayed instantaneously.

A live view function is used to determine a photographing composition or prepare for a photo opportunity while observing a displayed picture. Therefore, the display of the imaging apparatus needs to quickly display the moving image in order to allow a subject to be recognized.

Japanese Patent Application Laid-Open No. 2006-323300 discloses an improvement in moving image quality achieved by controlling the light emission period ratio based on the speed of the moving image obtained by analyzing a signal of a displayed image. However, the technology disclosed in Japanese Patent Application Laid-Open No. 2006-323300 is suitable for a display used to display content such as a TV monitor, but is not suitable for the display of the imaging apparatus due to poor responsiveness.

Further, the technology disclosed in Japanese Patent Application Laid-Open No. 2006-323300 compares the images between the frames in order to detect the moving image speed, which necessitates at least two frames to compare the images. Therefore, in the method of detecting the moving image speed, information on an image is sent to a display unit with a delay of at least a two-frame period. The display for the imaging apparatus needs to display an observed picture with high simultaneity, and the delay corresponding to multiple frames greatly affects usability.

SUMMARY OF THE INVENTION

The present invention has been devised in view of the above-mentioned circumstances, and an object thereof is to provide an imaging apparatus including a display device for displaying an observed picture with high simultaneity and with suppressed motion blur during a panning operation, and an image display method therefor.

In order to achieve the above-mentioned object, according to an exemplary embodiment of the present invention, there is provided an imaging apparatus, including: a lens;

an imaging unit for capturing an optical image that has entered through the lens from an imaging element;

a display device including multiple pixels whose light emission period is adjustable, for displaying the optical image captured from the imaging element as a picture;

an angular velocity sensor for detecting a movement of the imaging element;

a panning speed detection unit for detecting a panning speed based on an output from the angular velocity sensor;

a light emission period ratio determination unit for determining a light emission period ratio of each of the multiple pixels based on the panning speed; and a display device driving unit for causing the each of the multiple pixels to emit light based on the light emission period ratio.

Further features of the present invention will become apparent from the following description of exemplary embodiments with reference to the attached drawings.

DESCRIPTION OF THE EMBODIMENTS

As one of photographing techniques for pictures, or at a time of searching for a subject, a camera user sometimes performs a so-called "pan" which is an operation for changing an orientation of a camera at hand. During panning, the camera user only has to change the orientation of a lens at hand to cause an optical image input from the lens to move at an extremely high speed, and hence the image displayed on a display also moves at an extremely high speed. Accordingly, particularly during the panning, the display needs to have a high-speed performance of a moving image.

Now, an imaging apparatus and an image display method for the imaging apparatus according to an embodiment of the present invention are described with reference to the accompanying drawings.

(Configuration of Imaging Apparatus)

Figure 1:
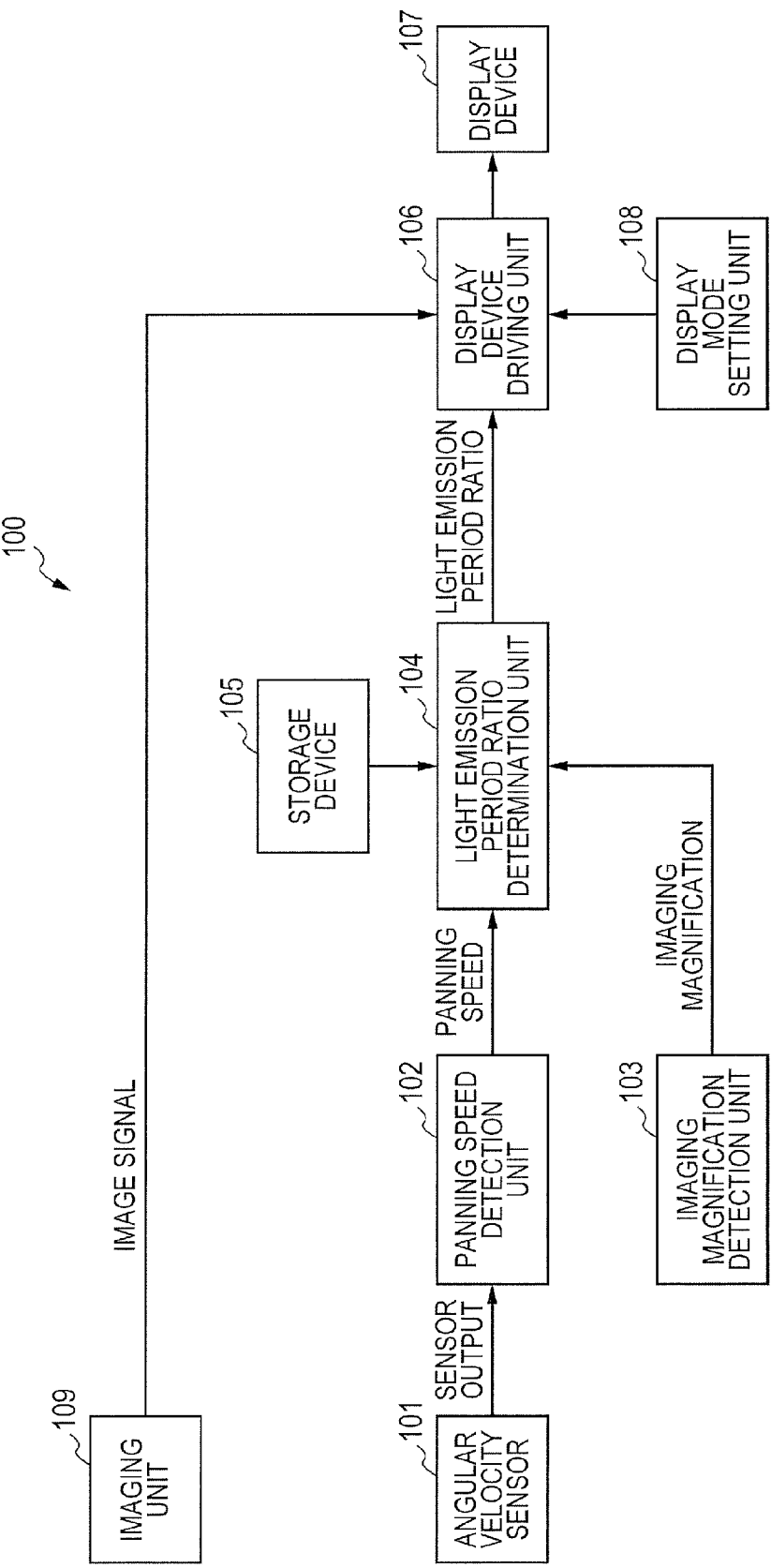
FIG. 1 is a block diagram illustrating a configuration of an imaging apparatus according to an embodiment of the present invention.
Figure 2:
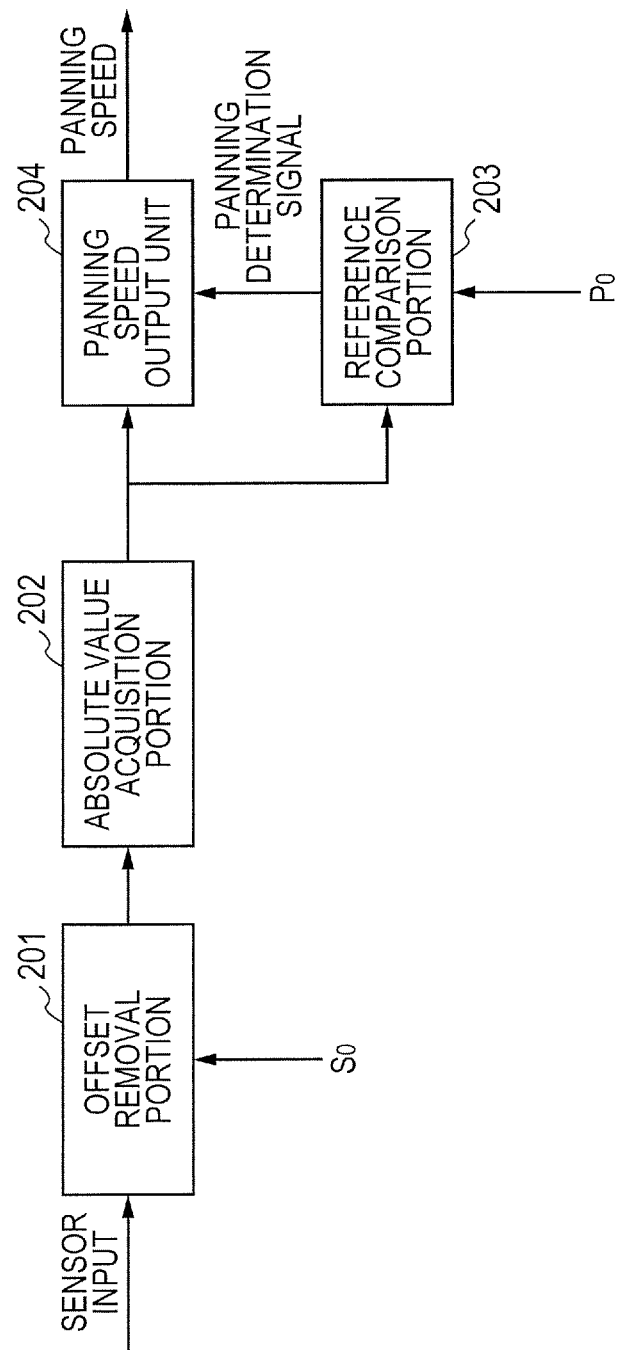
FIG. 2 is a block diagram illustrating an operation of a panning speed detection unit.

First, referring to FIG. 1 and FIG. 2, a configuration of the imaging apparatus according to this embodiment is described. FIG. 1 is a block diagram illustrating a configuration of the imaging apparatus according to this embodiment. FIG. 2 is a block diagram illustrating an operation of a panning speed detection unit.

As illustrated in FIG. 1, an imaging apparatus 100 according to this embodiment includes an angular velocity sensor 101, a panning speed detection unit 102, an imaging magnification detection unit 103, a light emission period ratio determination unit 104, and a storage device 105. In addition, the imaging apparatus 100 according to this embodiment includes a display device driving unit 106, a display device 107, a display mode setting unit 108, and an imaging unit 109. The respective components are described below in order.

The angular velocity sensor 101 is a sensor for detecting a movement of an imaging element (not shown) mounted to the imaging apparatus 100 according to this embodiment. The angular velocity sensor 101 detects the angular velocity of the imaging element in a direction determined in advance, and outputs the angular velocity to the panning speed detection unit 102.

The imaging unit 109 captures the optical image that has entered through the lens from the imaging element, and outputs the optical image as an image signal. Examples of the imaging element include a charge coupled device (CCD) and a complementary metal oxide semiconductor (CMOS). As the angular velocity sensor 101, any existing angular velocity sensor that is mounted to various imaging apparatus, such as a digital camera and a digital video camera, in order to provide an image stabilization function can be used.

The panning speed detection unit 102 determines from a sensor output from the angular velocity sensor 101 whether or not a panning operation is being performed, and outputs the panning speed to the light emission period ratio determination unit 104.

The panning speed detection unit 102 outputs the acquired panning speed when determining that the panning operation is being performed, and a panning speed of zero when determining that the panning operation is not being performed, to the light emission period ratio determination unit 104. Note that, the panning operation is not necessarily determined. The determination of the panning operation may be omitted, and the panning speed calculated from an output from an angular velocity sensor may be output to the light emission period ratio determination unit 104.

As illustrated in FIG. 2, the panning speed detection unit 102 includes an offset removal portion 201, an absolute value acquisition portion 202, a reference comparison portion 203, and a panning speed output unit 204.

The offset removal portion 201 subtracts an offset from a rotational direction waveform from which a high-frequency component has been removed. The absolute value acquisition portion 202 converts the rotational direction waveform from which the offset has been subtracted by the offset removal portion 201 into only a positive signal by acquiring an absolute value thereof. The reference comparison portion 203 compares the acquired positive signal with a preset threshold value to determine the panning operation. The panning speed output unit 204 outputs the acquired positive signal as the panning speed when it is determined by the reference comparison portion 203 that the panning operation is being performed. Note that, a specific example of determining the panning operation is described later.

As illustrated in FIG. 1, the imaging magnification detection unit 103 detects an imaging magnification of the lens during photographing, and outputs the imaging magnification to the light emission period ratio determination unit 104.

The light emission period ratio determination unit 104 calculates a light emission period ratio (light emission duty) by using the panning speed input from the panning speed detection unit 102 and the imaging magnification data input from the imaging magnification detection unit 103. The light emission period ratio determination unit 104 outputs the calculated light emission period ratio to the display device driving unit 106. The light emission period ratio can be determined in consideration of only the panning speed, but it is preferred that the light emission period ratio be determined also in consideration of imaging magnification data because it is possible to determine the light emission period ratio that is more suitable for a speed at which the image displayed on the display moves.

The panning speed detection unit 102, the imaging magnification detection unit 103, and the light emission period ratio determination unit 104 are formed of a processor (control portion) such as a microcomputer.

The storage device 105 accumulates in advance imaging information, such as point information and interpolation information, used for calculation of the light emission period ratio performed by the light emission period ratio determination unit 104. Examples of the storage device 105 include a nonvolatile memory such as a ROM.

The display device driving unit 106 receives the image signal from the imaging unit 109 or the like, and drives the display device 107. Examples of the display device driving unit 106 include an inverter circuit.

The display device 107 displays the optical image that has entered through the lens as the image. A display pixel of the display device 107 can have its light emission period adjusted. As the display pixel of the display device 107, a spontaneous emission-type light-emitting element, such as an organic EL element or an inorganic EL element, is preferred. The flat-panel type display using the organic EL element can turn on and off the light emission at a high speed, and can therefore, freely control the light emission period ratio, which can realize crisp image display with a reduced motion blur. Further, even a liquid crystal display device can control the light emission period ratio by writing black data after writing the image data.

The display mode setting unit 108 outputs a display mode set for the display device driving unit 106. The display mode setting unit 108 can set for the display device driving unit 106 any one of, for example, a real-time monitor mode such as live view, a playback monitor mode for displaying a recorded moving image or still image, and a device setting mode for setting photographing conditions and the like. That is, the display mode of the display device 107 can be switched depending on the setting made by the display mode setting unit 108. Display modes other than the real-time monitor mode have no relationship with the panning operation of the imaging element, and hence the present invention can be applied in the real-time monitor mode.

As described above, the imaging unit 109 includes the imaging element such as a CCD or a CMOS. The imaging unit 109 may include a lens that can change the imaging magnification closer to a side on which the optical image enters than the imaging element. Examples of the lens include a telephoto lens and a wide-angle lens.

(Operation of Imaging Apparatus and Image Display Method for Imaging Apparatus)

Next, referring to FIG. 1 to FIG. 7, the image display method for the imaging apparatus 100 according to this embodiment is described along with the operation of the above-mentioned imaging apparatus 100.

The image display method for the imaging apparatus 100 according to this embodiment includes an imaging display step, an angular velocity detection step, a panning speed detection step, an imaging magnification detection step, a light emission period ratio determination step, and a display device driving step.

First, in the imaging display step, the picture of a target object to be imaged by the camera user by using the imaging unit 109 is displayed on the display device 107 such as a finder or a back surface monitor.

In the angular velocity detection step, the movement of the imaging element (not shown) is detected by the angular velocity sensor 101, and a movement of the displayed image on the display device 107 is detected.

Figure 3A:
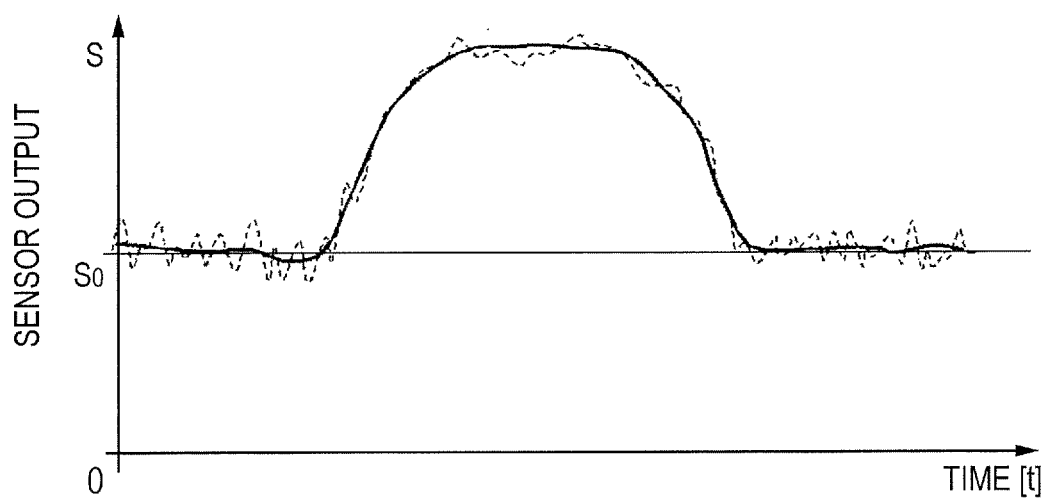
FIGS. 3A and 3B are explanatory diagrams showing an example of an output from an angular velocity sensor and an example of an output from the panning speed detection unit.
Figure 3B:
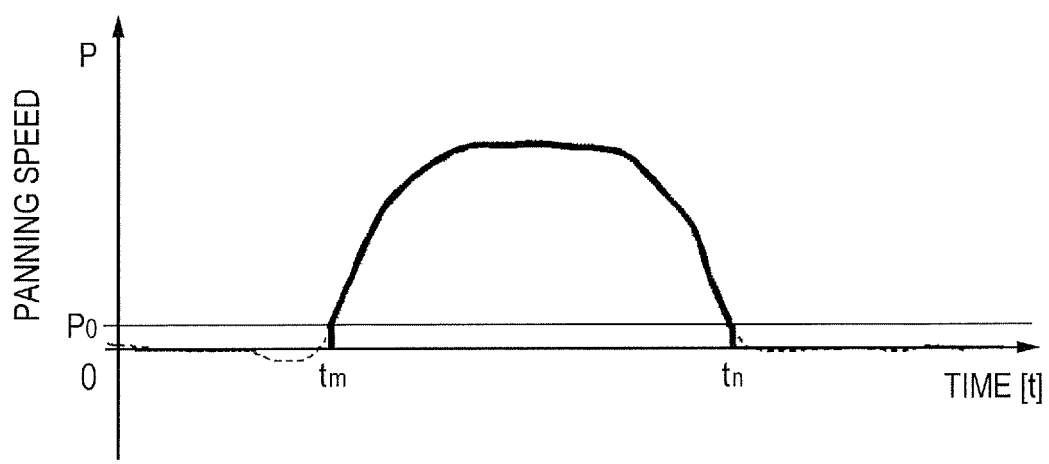

FIG. 3A is an explanatory diagram showing an example of a waveform output from the angular velocity sensor, and FIG. 3B is an explanatory diagram showing an example of an output from the panning speed detection unit.

The general angular velocity sensor 101 outputs differences from a given offset value of S0 based on the angular velocity around S0. In FIG. 3A, the waveform appears in a direction of an increase from S0. The waveform in the direction of the increase from S0 indicates that the movement of the displayed image occurs in a fixed direction. When the movement of the displayed image occurs in a direction reverse thereto, the waveform appears in a direction of a decrease from S0.

The detection itself of the movement of the displayed image involves a high-frequency component to some extent as indicated by the dashed line in FIG. 3A. The high-frequency component is caused by electrical noise or a camera shake. The waveform necessary for the determination of the panning is a waveform indicated by the solid line in FIG. 3A, and a waveform obtained by using a filter to remove the high-frequency component caused by the electrical noise or the camera shake is used as the output from the angular velocity sensor 101. The output from the angular velocity sensor 101 is used in a subsequent panning determination step.

In this embodiment, for the convenience of description, horizontal panning in a one-axis direction is assumed as an example, but the panning occurs in combination of vertical and horizontal directions of the display screen. In a case of detecting the panning in the vertical and horizontal directions, a device that can measure the angular velocities in two-axis directions of the vertical and horizontal directions may be used inside as the angular velocity sensor 101 to obtain the sensor output as a magnitude of the combination (vector sum) of the angular velocities in the vertical and horizontal directions. Note that, a vertical shake of the imaging apparatus 100 is referred to also as "tilting".

In the panning speed detection step, the panning speed is detected by the panning speed detection unit 102 from the angular velocity detected by the angular velocity sensor 101, and is output to the light emission period ratio determination unit 104.

Returning to FIG. 2, a method of detecting the panning speed is described. The panning speed detection step includes: subtracting the offset from the rotational direction waveform from which the high-frequency component has been removed; and converting the rotational direction waveform from which the offset has been subtracted into only a positive signal by acquiring an absolute value thereof. The panning speed detection step further includes: a panning operation determination step of determining the panning operation by comparing the acquired positive signal with a preset threshold value; and a step of outputting the acquired positive signal as the panning speed when it is determined that the panning operation is being performed. Note that, the panning operation determination step is not essential and may be omitted. When omitted, the positive signal may be output as the panning speed as it is. The panning speed detection step and operations of the panning speed detection unit 102 are concretely described below.

As described above, the high-frequency component caused by the electrical noise or the camera shake, which is not involved in the panning operation, is removed from the sensor output from the angular velocity sensor 101 (see the solid line of FIG. 3A). When the offset of S0 is subtracted from the waveform of the solid line by the offset removal portion 201, the waveform shown in FIG. 3B is obtained, in which the positive and negative of the waveform can be distinguished depending on a moving direction of the displayed image.

However, there is no need to distinguish the moving direction of the displayed image as the panning speed, and hence the absolute value acquisition portion 202 in the subsequent stage performs the conversion into only the positive signal.

Subsequently, the panning speed detection unit 102 uses the reference comparison portion 203 to compare the acquired positive signal with a preset threshold value P0 and determine whether or not the acquired positive signal is equal to or larger than P0 (see FIG. 3B). With this operation, in the example of FIG. 3B, it is determined that the panning operation is being performed from a time instant tm to a time instant tn.

When detecting the panning operation, the reference comparison portion 203 outputs a panning determination signal to the panning speed output unit 204.

When receiving the panning determination signal from the reference comparison portion 203, the panning speed output unit 204 outputs a signal received from the absolute value acquisition portion 202 as the panning speed as it is if the panning operation is being performed. When the panning operation is not being performed, the panning speed output unit 204 outputs zero as the panning speed. With the operation, the panning speed detection unit 102 outputs the panning speed to the light emission period ratio determination unit 104 in the subsequent stage.

In the imaging magnification detection step, the imaging magnification of the lens provided to the imaging unit 109 is detected, and the imaging magnification is output to the light emission period ratio determination unit 104 in the subsequent stage.

In the light emission period ratio determination step, the light emission period ratio of the display pixel of the display device 107 is calculated by using the panning speed and the imaging magnification data. That is, in the light emission period ratio determination step, the light emission period ratio (light emission duty) is determined by using the panning speed received from the panning speed detection unit 102 and the imaging magnification data received from the imaging magnification detection unit 103, which are input to the light emission period ratio determination unit 104. The moving speed (hereinafter referred to as the "scrolling speed") of the image displayed on the display device 107 during the panning operation is affected by the imaging magnification, not to mention the magnitude of the angular velocity of the panning operation, and hence it is preferred that the light emission period ratio be determined in consideration of the imaging magnification.

Figure 4A:
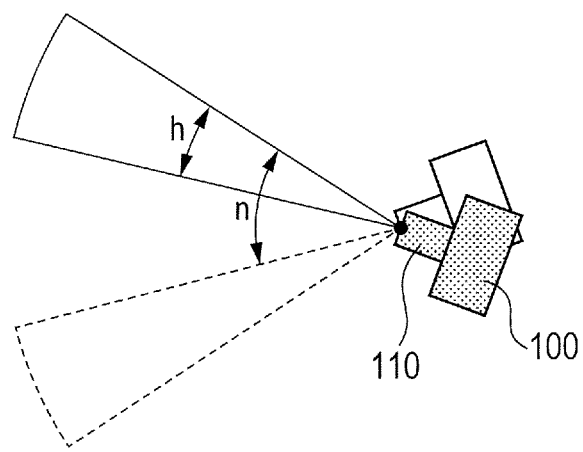
FIGS. 4A and 4B are explanatory diagrams illustrating a relationship between panning operations on a telephoto side and a wide-angle side of the imaging apparatus.
Figure 4B:
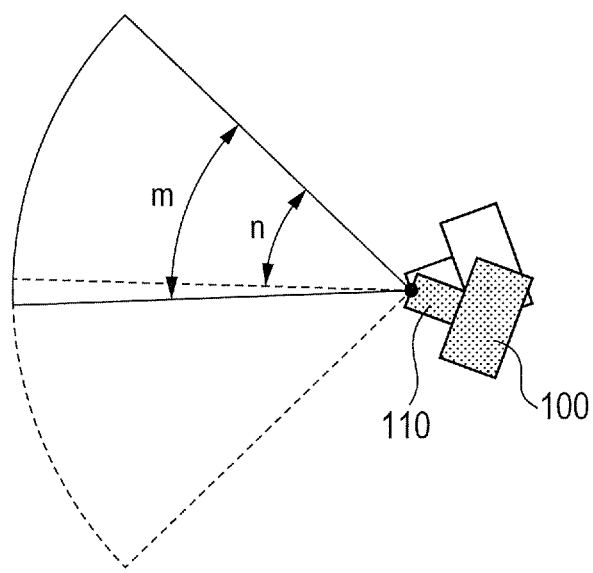

FIGS. 4A and 4B are explanatory diagrams illustrating the relationship between panning operations on a telephoto side and a wide-angle side of the imaging apparatus. In FIGS. 4A and 4B, the imaging apparatus 100 and an image of an angle of view of the imaging apparatus 100 are illustrated in a fan shape. FIG. 4A illustrates the telephoto side in a case where a lens 110 having an angle of view of h degrees is rotated counterclockwise by n degrees. FIG. 4B illustrates the wide-angle side in a case where the lens having an angle of view of m degrees is rotated counterclockwise by n degrees. When the lens is panned by n degrees in the same unit time in both the cases, a speed of the image displayed on the screen is 1+n/m on the wide-angle side and is 1+n/h on the telephoto side. For example, m is three times as large as h in a case where there is a difference of three times in the imaging magnification. Therefore, for example, when the lens is moved at n=m, a speed of 2 is obtained on the wide-angle side, and a speed of 4 is obtained on the telephoto side, which means that the displayed image moves at a double scrolling speed on the telephoto side compared to the wide-angle side.

Figure 5:
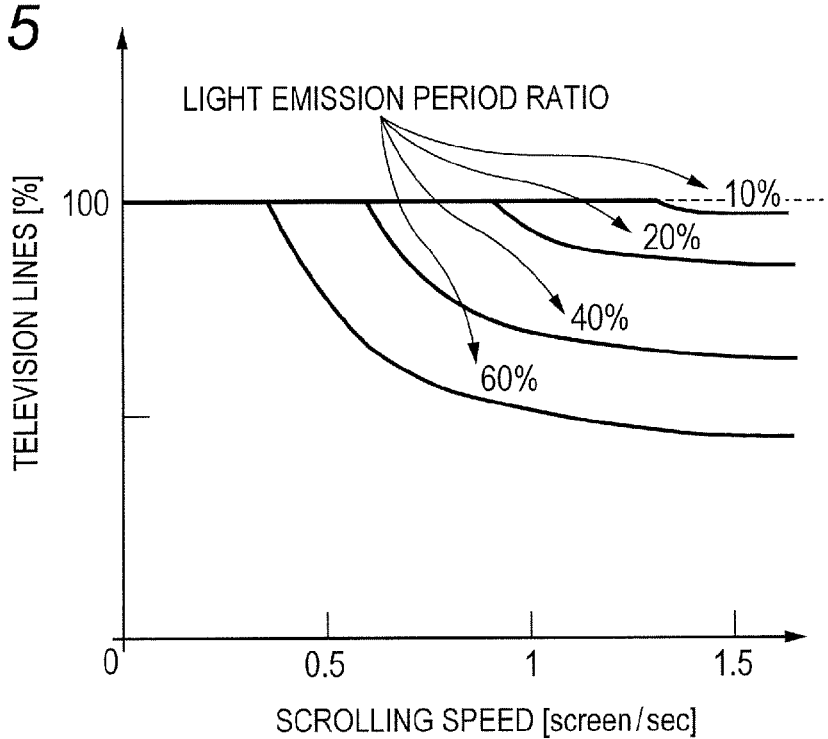
FIG. 5 is an explanatory diagram showing a relationship of a degree of a motion blur relative to a scrolling speed.

Next, referring to FIG. 5, the motion blur relative to the scrolling speed of the moving image is described. FIG. 5 is an explanatory diagram showing a relationship of a degree of the motion blur relative to the scrolling speed.

In FIG. 5, television lines of the vertical axis are a unit representing a horizontal resolution of a television screen, and indicate how many couples of black and white lines can be discerned within a horizontal width equal to a height of the screen in a vertical direction. This indicates that 100% of lines are visible at a low scrolling speed, while the motion blur occurs at a higher ratio at a higher speed to inhibit 100% of lines from being resolved.

10%, 20%, 40%, and 60% of FIG. 5 indicate the light emission period ratios of a display device. For example, with the display device having the light emission period ratio of 60%, the television lines start to decrease from around the scrolling speed of 0.5 [screen/sec]. This indicates that the display device having the light emission period ratio of 60% causes the motion blur at the scrolling speed of 0.5 [screen/sec] or faster. Therefore, it is conceivable that the light emission period ratio is set small in advance in order to handle the panning operation exhibiting a high scrolling speed.

However, when the light emission period ratio is set smaller than 50%, a flicker phenomenon is observed depending on the displayed image, and the image quality deteriorates. This is a phenomenon in which the screen looks to be flickering at a high speed because the ratio of a non-light emission period increases as the light emission period ratio decreases.

Figure 6:
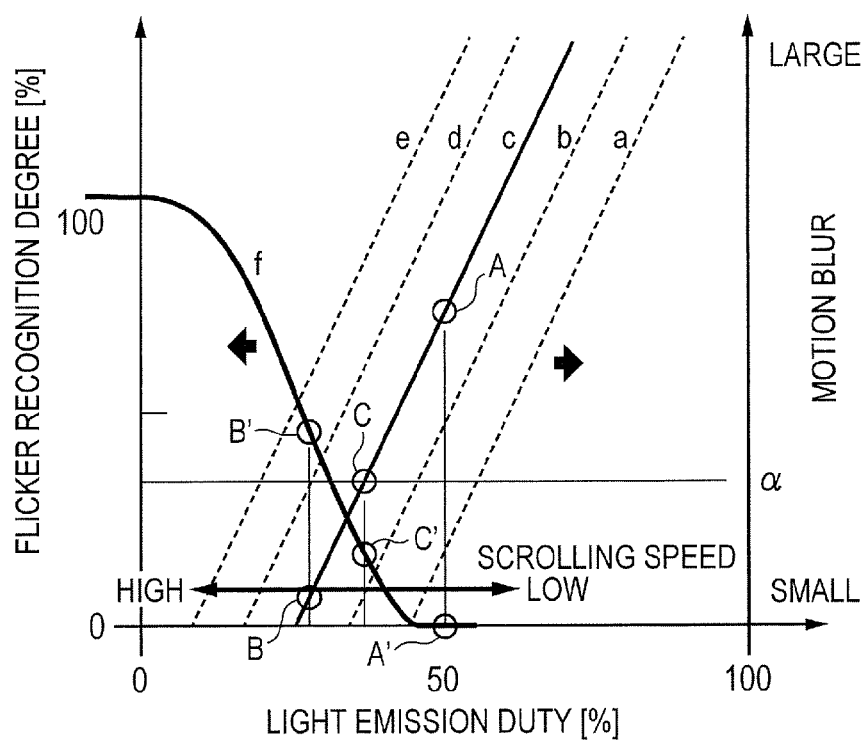
FIG. 6 is an explanatory diagram showing a relationship between a flicker recognition degree and a light emission period ratio of the motion blur.

Next, referring to FIG. 6, the relationship between a flicker recognition degree and the light emission period ratio of the motion blur is described. FIG. 6 is an explanatory diagram showing the relationship between the flicker recognition degree and the light emission period ratio of the motion blur.

In FIG. 6, the solid lines c and f indicate characteristics of the motion blur (c) at a given scrolling speed and a flicker recognition degree (f), respectively. The characteristics of the remaining dashed lines indicate motion blur characteristics in a case where the scrolling speed of the displayed image is different from the case of c. The scrolling speed becomes higher in the order of from a to e.

Here, the flicker recognition degree f is obtained from the ratio of an average number of persons who have recognized a predetermined still image displayed with the light emission period ratio changed in sensory evaluation research. Further, the amount by which the observed television lines has decreased from 100% is used as the amount of the motion blur.

For example, in the case of c, with the light emission period ratio of 50%, the flicker recognition degree is almost zero (A'), while the motion blur is at a level of A, which means that the motion blur is large. When the light emission period ratio drops down to around 25%, the motion blur becomes approximately zero (B), while the flicker recognition degree rises up to a position of B'.

Further, the setting may be performed by setting an allowable value of the motion blur (for example, a of FIG. 6). In this case, the motion blur is C, and the flicker recognition degree has a value of C'.

Note that, here the flicker recognition degree f is obtained in the case where the still image is displayed and evaluated as described above. In general, in the case of displaying the moving image, the flicker phenomenon tends to be hardly recognized depending on the speed of the moving image, and hence FIG. 6 shows f as a case where the flicker phenomenon is recognized most sensitively. Therefore, it is conceivable that, when the scrolling speed increases with the motion blur characteristic shifting from a toward e, the flicker recognition degree f corresponding thereto shifts toward the left accordingly.

With the above-mentioned characteristics taken into consideration, it is preferred that the light emission period ratio be determined based on a balance between the two values of the flicker recognition degree and the motion blur depending on the displayed image. The balance is adjusted by the purpose or the like of the imaging apparatus. This is because importance is put on the motion blur or on the flicker recognition degree depending on the purpose of using the imaging apparatus.

For example, the digital camera or the like mainly used for the still image may need to put more importance on suppression of the flicker phenomenon than that of the motion blur. A digital video camcorder or the like mainly used for the moving image may be set so that the importance is put on confirmation of a focus or the like during the panning operation by suppressing the motion blur even with the flicker phenomenon allowed to some extent. This setting is adjusted based on a relationship, which is described below, between the scrolling speed and the corresponding set light emission period ratio set.

Figure 7:
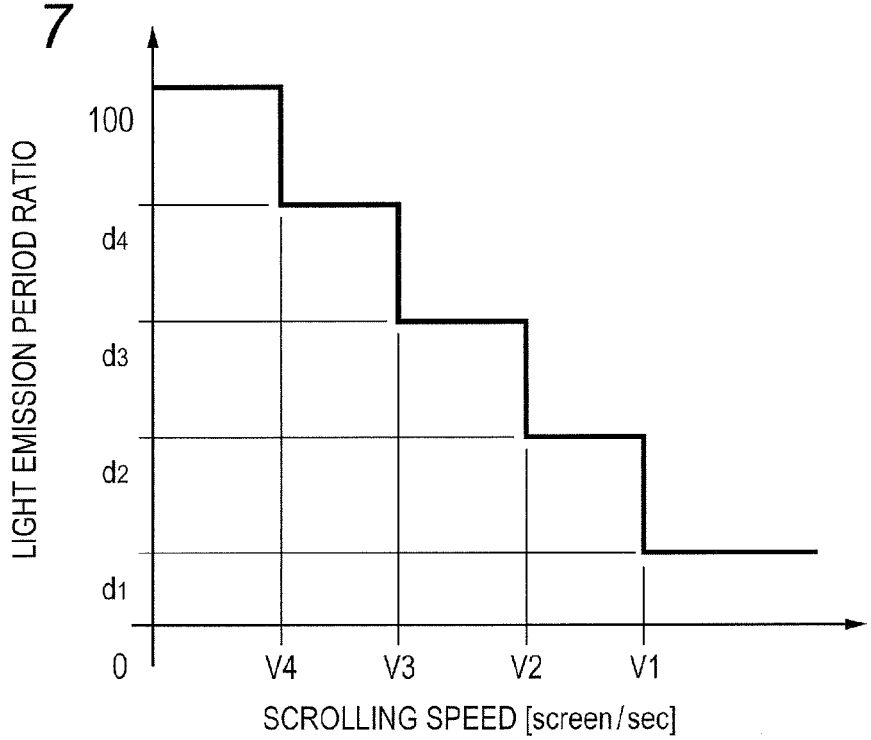
FIG. 7 is an explanatory diagram showing a setting example of the light emission period ratio relative to the scrolling speed.

Next, referring to FIG. 7, a setting example of the scrolling speed and the light emission period ratio is described. FIG. 7 is an explanatory diagram showing the setting example of the light emission period ratio relative to the scrolling speed.

The light emission period ratio determination unit 104 determines the light emission period ratio by using a setting shown in FIG. 7. As shown in FIG. 7, the light emission period ratio is set so as to be smaller as a detection scrolling speed increases.

By comparing the detection scrolling speed with V1 to V4, an arithmetic operation is performed so that the light emission period ratio is set to one of d1 to d4 or 100% in accordance with a position in which the detection scrolling speed falls. The respective values of the above-mentioned V1 to V4 and d1 to d4 are set in advance in accordance with the usage of the display device described above.

In the example of FIG. 7, switching is performed at four kinds of points (V1 to V4), but the number thereof is not necessarily four, and it is possible to provide more points to exhibit a smooth change. Further, values between points can be interpolated and calculated by a specific arithmetic operation.

Those point information and interpolation information are accumulated in advance on the storage device 105 connected to the light emission period ratio determination unit 104. In other words, in the light emission period ratio determination step, the imaging information necessary for the calculation of the light emission period ratio stored on the storage device 105 is read to calculate the light emission period ratio.

Figure 8:
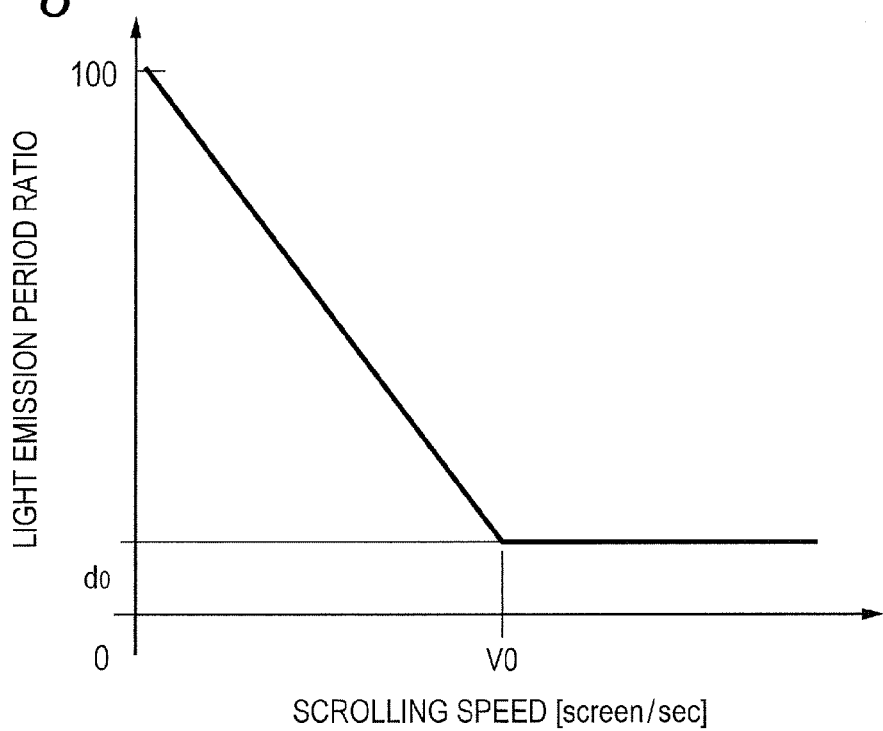
FIG. 8 is an explanatory diagram showing a setting example of the light emission period ratio relative to the scrolling speed.

Further, referring to FIG. 8, another setting example of the scrolling speed and the light emission period ratio is described. In this setting example, the imaging apparatus 100 of FIG. 1 is used to control the light emission period ratio based on the waveform shown in FIG. 8. Note that, as the display device 107, the flat-panel display using the organic EL element is used.

FIG. 8 is an explanatory diagram showing the setting example of the light emission period ratio relative to the scrolling speed. As shown in FIG. 8, when the display device 107 is driven so that the light emission period ratio is reduced along the straight line within the range of the scrolling speed of zero to V0 with V0 set to 3 [screen/sec] and d0 set to 15%, the motion blur is not detected during the panning operation in the normal photographing. According to the imaging apparatus 100 of the setting example of FIG. 8, crisp picture display is observed without degradation in the image quality during the panning operation.

The signal of the light emission period ratio determined by the light emission period ratio determination unit 104 is output to the display device driving unit 106 in the subsequent stage.

In the display device driving step, the display device driving unit 106 drives the display device 107 by using the light emission period ratio determined by the light emission period ratio determination unit 104. The display device driving unit 106 determines an instantaneous luminance of the light emission of the display pixel of the display device 107 based on the light emission period ratio received from the light emission period ratio determination unit 104, and drives the display device 107 in the subsequent stage by using the instantaneous luminance and the received light emission period ratio.

Even when the light emission period ratio changes, the display device driving unit 106 adjusts the instantaneous luminance based on the light emission period ratio so as to maintain an apparent luminance of the display device 107, and outputs the instantaneous luminance. For example, when the light emission period ratio is reduced to a half, it is possible to maintain the apparent luminance (average luminance) of the display device 107 at a fixed level by doubling the instantaneous luminance of the display pixel.

In the display device driving step, it is possible to set the display mode of the display device 107. The display device driving unit 106 changes the light emission period ratio only when the real-time monitor mode such as the live view is set by the display mode setting unit 108.

As described above, according to the imaging apparatus 100 and the image display method therefor of this embodiment, the light emission period ratio of the display pixel is determined from the panning speed of the imaging apparatus 100 during the panning operation. Accordingly, the picture display can be controlled by estimating the light emission period of the display device 107 in real time. Therefore, the imaging apparatus 100 and the image display method therefor according to this embodiment can suppress the motion blur during the panning operation, and can display the image on the display device 107 with extremely high simultaneity without a delay after the image is input.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2012-132867, filed Jun. 12, 2012, which is hereby incorporated by reference herein in its entirety.

What is claimed is:

1. An imaging apparatus, comprising:
   a lens;
   an imaging unit configured to capture an optical image that has entered through the lens from an imaging element;
   a display device comprising multiple pixels whose light emission period is adjustable, configured to display the optical image captured from the imaging element as a picture;
   an angular velocity sensor configured to detect a movement of the imaging element;
   a panning speed detection unit configured to detect a panning speed based on an output from the angular velocity sensor;
   a light emission period ratio determination unit configured to determine a light emission period ratio of each of the multiple pixels based on the panning speed; and
   a display device driving unit configured to cause the each of the multiple pixels to emit light based on the light emission period ratio,
   wherein the panning speed detection unit comprises:
      an offset removal portion configured to subtract an offset from a rotational direction waveform obtained by removing a high-frequency component from the output from the angular velocity sensor; and
      an absolute value acquisition portion configured to convert the rotational direction waveform from which the offset has been subtracted by the offset removal portion into a positive signal by acquiring an absolute value of the rotational direction waveform, and
   wherein the panning speed detection unit outputs the positive signal as the panning speed.

2. The imaging apparatus according to claim 1, further comprising an imaging magnification detection unit configured to detect an imaging magnification of the lens,
   wherein the light emission period ratio determination unit determines the light emission period ratio of the each of the multiple pixels by using the panning speed and data on the imaging magnification.

3. The imaging apparatus according to claim 1, wherein:
   the panning speed detection unit comprises a reference comparison portion configured to determine a panning operation, and
   wherein the reference comparison portion compares a positive signal with a threshold value set in advance, outputs the positive signal as the panning speed when the positive signal is equal to or larger than the threshold value, and outputs zero as the panning speed when the positive signal is smaller than the threshold value.

4. The imaging apparatus according to claim 1, wherein the light emission period ratio determination unit comprises a storage device configured to store imaging information necessary for a determination of the light emission period ratio.

5. The imaging apparatus according to claim 1, wherein the display device driving unit comprises a display mode setting unit configured to set a display mode of the display device.

6. The imaging apparatus according to claim 1, wherein the display device driving unit adjusts an instantaneous luminance in synchronization with a change of the light emission period ratio of the each of the multiple pixels, and maintains an average luminance of the display device at a fixed level.

7. The imaging apparatus according to claim 1, wherein the multiple pixels of the display device each comprise a spontaneous emission-type light-emitting element.

8. The imaging apparatus according to claim 7, wherein the spontaneous emission-type light-emitting element comprises an organic EL element.

9. An image display method for an imaging apparatus including an imaging unit comprising a lens and an imaging element, and a display device, the image display method comprising:
- an imaging display step of displaying an optical image acquired by the imaging unit as an image on the display device;
- an angular velocity detection step of detecting a movement of the imaging element;
- a panning speed detection step of detecting a panning speed based on an angular velocity detected in the angular velocity detection step;
- a light emission period ratio determination step of determining a light emission period ratio of a pixel of the display device based on the panning speed; and
- a display device driving step of causing the pixel to emit light based on the light emission period ratio,
- wherein the panning speed detection step comprises:
    - a panning operation determination step of determining whether or not a panning operation is being performed;
    - a step of outputting the detected panning speed when it is determined that the panning operation is being performed;
    - a step of outputting zero as the panning speed when it is not determined that the panning operation is being performed;
- wherein the panning operation determination step comprises the steps of:
    - subtracting an offset from a rotational direction waveform obtained by removing a high-frequency component from the movement of the imaging element detected in the angular velocity detection step;
    - converting the rotational direction waveform from which the offset has been subtracted into only a positive signal by acquiring an absolute value of the rotational direction waveform; and
    - comparing the positive signal with a threshold value set in advance, and determining that the panning operation is being performed when the positive signal is equal to or larger than the threshold value.

10. The image display method for an imaging apparatus according to claim 9, further comprising an imaging magnification detection step of detecting an imaging magnification of the lens,
- wherein the light emission period ratio determination step comprises determining the light emission period ratio based on the detected panning speed and the detected imaging magnification of the lens.

11. The image display method for an imaging apparatus according to claim 9, wherein the light emission period ratio determination step comprises reading imaging information necessary for a determination of the light emission period ratio stored on a storage device to determine the light emission period ratio.

12. The image display method for an imaging apparatus according to claim 9, wherein:
- the imaging apparatus is configured to set multiple display modes comprising a real-time monitor mode; and
- the display device driving step comprises causing the pixel to emit light based on the light emission period ratio determined in the light emission period ratio determination step only in a case where the display mode of the display device is set to the real-time monitor mode.

* * * * *